United States Patent
Li

(10) Patent No.: US 10,569,137 B2
(45) Date of Patent: Feb. 25, 2020

(54) APPARATUS, SYSTEM AND METHOD FOR HEALTHY MOTION ENVIRONMENT MANAGING

(71) Applicant: Xiamen Cowell Industrial Ltd., Xiamen (CN)

(72) Inventor: Yao-Jun Li, Xiamen (CN)

(73) Assignee: Xiamen Cowell Industrial Ltd., Xiamen (CN)

( * ) Notice: Subject to any disclaimer, the term of this patent is extended or adjusted under 35 U.S.C. 154(b) by 210 days.

(21) Appl. No.: 15/657,953

(22) Filed: Jul. 24, 2017

(65) Prior Publication Data

US 2018/0028866 A1   Feb. 1, 2018

(30) Foreign Application Priority Data

Aug. 1, 2016 (CN) .......................... 2016 1 0621480

(51) Int. Cl.
*A63B 24/00* (2006.01)
*A63B 1/00* (2006.01)
(Continued)

(52) U.S. Cl.
CPC ............ *A63B 24/0087* (2013.01); *A63B 1/00* (2013.01); *A63B 22/0076* (2013.01);
(Continued)

(58) Field of Classification Search
CPC . A63B 22/0076; A63B 22/02; A63B 22/0235; A63B 22/0242; A63B 22/025; A63B 22/04; A63B 22/06; A63B 22/0605; A63B 22/0664; A63B 24/0062; A63B 24/0075; A63B 24/0087; A63B 2024/0065; A63B 2024/0068; A63B 2024/0071; A63B 2024/0078; A63B 2024/0081; A63B 2024/009; A63B 2024/0093; A63B 2024/0096; A63B 71/06; A63B 71/0686;
(Continued)

(56) References Cited

U.S. PATENT DOCUMENTS

2012/0238921 A1* 9/2012 Kuehne ................ A61H 1/0229
                                                              601/5
2014/0067097 A1* 3/2014 Harris .................... A63B 71/06
                                                              700/91

(Continued)

*Primary Examiner* — Gary D Urbiel Goldner
(74) *Attorney, Agent, or Firm* — Wang Law Firm, Inc.

(57) ABSTRACT

A healthy motion environment managing apparatus includes a wearable intelligent equipment, an environment adjusting equipment, a fitness equipment and an environment parameter collecting equipment. The wearable intelligent equipment includes an input unit, a memory unit, a processing unit and a communication unit. The environment parameter collecting equipment configured for sending a value of a collected current environment parameter to the wearable intelligent equipment. The processing unit compares a difference of the value of the collected current environment parameter and a value of one of optimum motion environment parameters, if the difference is larger than a set threshold, a start instruction is sent to the environment adjusting equipment via the communication unit. The invention can adjust the motion environment quickly and conveniently and can improve the user experience greatly.

6 Claims, 3 Drawing Sheets

(51) Int. Cl.
*A63B 22/02* (2006.01)
*A63B 22/00* (2006.01)
*A63B 22/06* (2006.01)
*F24F 110/20* (2018.01)
*F24F 110/64* (2018.01)
*F24F 120/10* (2018.01)
*F24F 11/64* (2018.01)
*F24F 11/30* (2018.01)
*F24F 110/10* (2018.01)
*F24F 11/52* (2018.01)
*F24F 11/58* (2018.01)
*H04W 4/80* (2018.01)

(52) U.S. Cl.
CPC ........ *A63B 22/025* (2015.10); *A63B 22/0605* (2013.01); *A63B 22/0664* (2013.01); *A63B 24/00* (2013.01); *A63B 2225/50* (2013.01); *F24F 11/30* (2018.01); *F24F 11/52* (2018.01); *F24F 11/58* (2018.01); *F24F 11/64* (2018.01); *F24F 2110/10* (2018.01); *F24F 2110/20* (2018.01); *F24F 2110/64* (2018.01); *F24F 2120/10* (2018.01); *F24F 2221/38* (2013.01); *H04W 4/80* (2018.02)

(58) Field of Classification Search
CPC .... A63B 2071/0675; A63B 2071/0683; A63B 2220/70; A63B 2220/72; A63B 2220/73; A63B 2220/74; A63B 2220/76; A63B 2220/78; A63B 2220/80; A63B 2225/215; A63B 2225/20; A63B 2225/30; A63B 2225/305; A63B 2225/50; A63B 2225/52; A63B 2225/54; F24F 2110/20; F24F 2110/64; F24F 2120/10; F24F 11/64; F24F 11/30; F24F 2110/10; F24F 11/52; F24F 11/58; F24F 2221/38; H04W 4/80
See application file for complete search history.

(56) References Cited

U.S. PATENT DOCUMENTS

| | | | | |
|---|---|---|---|---|
| 2014/0363800 | A1* | 12/2014 | Harris | G09B 19/003 434/247 |
| 2015/0238819 | A1* | 8/2015 | Volkerink | H04W 4/70 482/4 |
| 2015/0258560 | A1* | 9/2015 | Ashby | A63B 71/0622 239/70 |
| 2016/0023081 | A1* | 1/2016 | Popa-Simil | A63B 69/16 700/91 |
| 2016/0144236 | A1* | 5/2016 | Ko | A63B 24/0062 434/247 |
| 2016/0375308 | A1* | 12/2016 | Anderson | A63B 24/0087 482/5 |
| 2018/0178064 | A1* | 6/2018 | Nah | A63B 24/0062 |
| 2018/0207480 | A1* | 7/2018 | Hong | A63B 71/1225 |

* cited by examiner

APPARATUS, SYSTEM AND METHOD FOR HEALTHY MOTION ENVIRONMENT MANAGING

CROSS-REFERENCE TO RELATED APPLICATION

This application claims priority from CN Application No. 201610621480.2, filed on Aug. 1, 2016, in the State Intellectual Property Office of the People's Republic of China, the content of which is hereby incorporated by reference in their entirety for all purposes.

BACKGROUND OF THE INVENTION

1. Field of the Invention

The present invention relates to an environment adjusting and controlling, and in particular, to an apparatus, system and method for healthy motion environment managing.

2. Description of the Related Art

It is understood that healthy is important for people, people concern about healthy problems more and more now. More and more people go to gyms or buy fitness equipments for indoor exercising to have healthy physiques. In general, the fitness equipment can be one of a treadmill, an exercise cycle, a racing car, an elliptical car, a stationary bike, a row machine, a strength training machine and so on. But now people usually ignore environmental factors when they do exercise using the equipments, researches show that it will hurt the bodies of people who do exercises in the disadvantage environments. Take the temperature and humidity as example, the air humidity effects the human body a little when the temperature is moderate (20-25° C.), but the high humidity is disadvantage to the human body when the temperature is high or low, the higher humidity hinders the path of body's evaporation, the balance of heat exchange of the human body is broken, so that the normal function of the human body will be damaged.

In order to work out in healthy environment, people usually put the environment adjusting equipments indoor, such as the temperature control equipment (like air condition), the air purification equipment and the humidity control equipment (such as humidifier), etc., these equipments are usually put in the corner away from fitness equipment indoor, and the user opens these equipments and sets the appropriate equipment parameters like the temperature, the humidity and so on at the beginning of his/her training manually.

The motion environment will change according to the increasing of user's training time and the equipment's running time, the user will feel that the set environment parameters are not suitable, like the previously set temperature or humidity is too high or too low, and so on. Therefore, the user will stop training and adjust the parameters of the environment equipment one by one.

This adjusting procedure need to interrupt the user's training, and make the user reset the equipment parameters one by one. The adjusting procedure is so complicated which greatly reduces the user's training experience. The adjustment of environment parameters is based on the user's personal feelings, and there is so blindness (i.e. adjusted environmental parameters are not the optimum environment parameters). Nowadays there are some environment equipments using remote controlling, but the controllers/remoters are usually away from the fitness equipment, similar to the previous manual adjustment, so the user still need to stop the training to adjust the environment parameters by the controllers/remoters. Accordingly, the adjusting procedure still has the complicate and blindness problem, and has the lower user's training experience.

SUMMARY OF THE INVENTION

In the view of the problems of the prior art, an object of the present invention is to provide an apparatus, system and method for healthy motion environment managing.

A healthy motion environment managing apparatus, including a wearable intelligent equipment, an environment adjusting equipment and a fitness equipment, is characterized in that, the wearable intelligent equipment comprises: an input unit, obtaining personal information of a current user; a memory unit, pre-storing corresponding relation of the user's personal information and the optimum motion environment parameters; a processing unit, obtaining the optimum motion parameter corresponding to the current user based on the obtained current user's personal information and corresponding relation of the user's personal information and the optimum motion environment parameters; and a communication unit, sending obtained optimum motion parameter to the environment adjusting equipment and/or the fitness equipment.

Preferably, the optimum motion environment parameters comprise the parameters of the environment adjusting equipment and the fitness equipment.

Preferably, the input unit obtains the value of a motion environmental parameter set by the current user.

Preferably, the communication unit sends the value of motion environment parameters set by the current user to the environment adjusting equipment and/or the fitness equipment.

Preferably, the corresponding relation of the user's personal information and the optimum motion environment parameters include a correspondence table of the user's personal information and optimum environment adjusting equipment parameters and a correspondence table of the user's personal information and optimum fitness equipment parameters.

Preferably, the healthy motion environment managing apparatus further includes: an environment parameter collecting equipment, sending the collected the value of a current environment parameter to the environment adjusting equipment; wherein the environment adjusting equipment compares the difference of the value of received optimum motion environment parameter and the current environment parameter, and if the difference is larger than the set threshold, the environment adjusting equipment is started, in order to make the value of the current environment parameter reach the value of the optimum motion environment parameter.

Preferably, the healthy motion environment managing apparatus further includes: an environment parameter collecting equipment, sending the value of the collected current environment parameter to the intelligent equipment; wherein the processing unit compares the difference of the value of optimum motion environment parameter and the value of current environment parameter, and if the difference is larger than the set threshold, a start instruction is sent to the environment adjusting equipment via the communication unit.

Preferably, the fitness equipment compares the value of received optimum environment parameter and current equipment parameter, and adjusts the value of the current equipment parameter when the value of the current equipment parameter is out of the value of the optimum environment parameter, in order to make the value of the current equipment parameter equal to the value of the optimum environment parameter.

A healthy motion environment managing system, including a cloudy server, a wearable intelligent equipment, a fitness equipment and an environment adjusting equipment, is characterized in: the wearable intelligent equipment obtains the current user's personal information and sends the current user's personal information to the cloudy server; the cloudy server pre-stores the corresponding relation of the user's personal information and the optimum motion environment parameters, obtains the value of the optimum motion environment parameter corresponding to the current user based on the obtained current user's personal information and the pre-stored corresponding relation of the user's personal information and the optimum motion environment parameters, and sends the value of the optimum motion environment parameter to the wearable intelligent device; the wearable intelligent equipment sends the value of the obtained optimum motion environment parameter to the environment adjusting equipment and/or fitness equipment.

Preferably, the optimum motion environment parameters include the parameter of the environment adjusting equipment and the fitness equipment.

A healthy motion environment managing method comprises the following steps: S100: obtaining the current user's personal information; S200: pre-storing the corresponding relation of the user's personal information and the optimum motion environment parameters; S300: obtaining the value of the optimum motion environment parameter corresponding to the current user, based on the obtained current user's personal information and the pre-stored corresponding relation of the user's information and the optimum motion environment parameters; and S400: adjusting the value of the current environment parameter to the value of optimum motion environment parameter.

The invention has the advantage as follows.

The wearable intelligent equipment is the core, and the user wears the intelligent equipment during their training, parameters of the environmental equipment and fitness equipment (that is environmental parameters) are adjusted by the intelligent equipment in order to reach the optimum motion environment. The environment parameters can be adjusted based on user's personal information, so the user can get most appropriate optimum motion environment. It avoids the blindness of adjustment.

The user can finish the environmental adjustment during the workout process through inputting the environment parameters to the intelligent equipment and does not need to interrupt the training or be away from the fitness equipment to adjust the environment equipment one by one. The adjustment procedure is simple and fast, which greatly improves the user's training experience.

DESCRIPTION OF THE EXEMPLARY EMBODIMENTS

The above and other objects, features, and advantages of the present invention will become more apparent from the following detailed description when taken in conjunction with the accompanying drawings in which.

Embodiment 1

Figure 1:
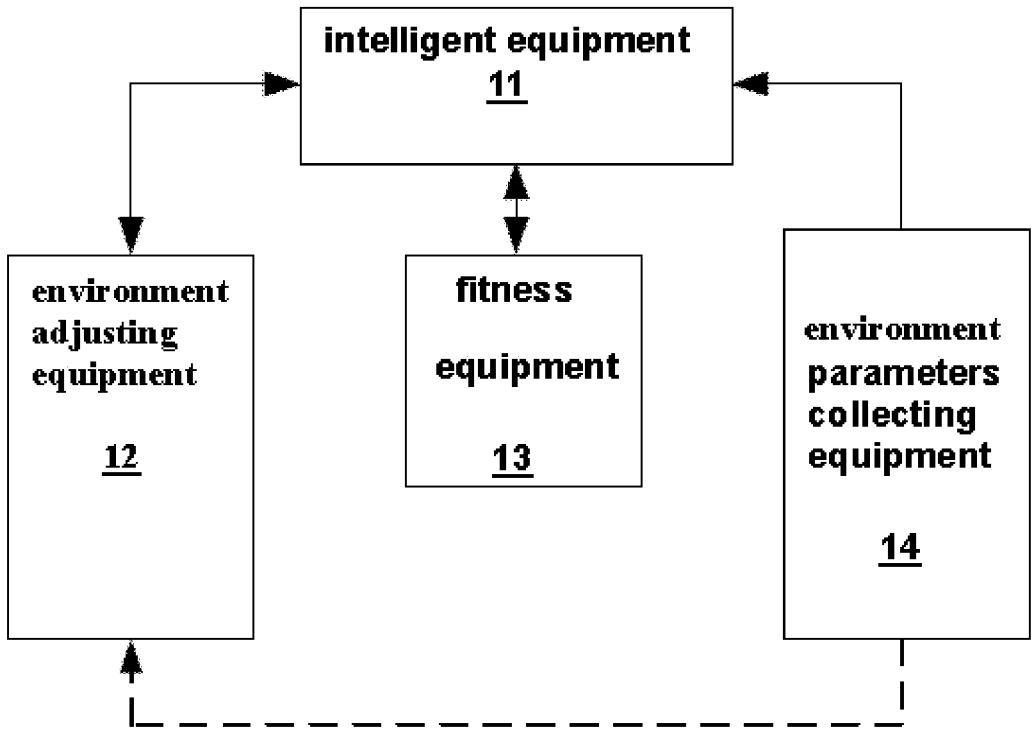
FIG. 1 is a schematic diagram representing an environment managing apparatus according to an embodiment of the invention.

First, a healthy exercise environment managing apparatus according to the present invention will be described. With reference to FIG. 1, a healthy motion environment managing apparatus includes an intelligent equipment 11, an environment adjusting equipment 12, a fitness equipment 13 and an environment parameter collection equipment 14. The environment adjusting equipment 12, the fitness equipment 13 and the environment parameter collecting equipment 14 communicates to the intelligent equipment 11 by a wired or wireless manner.

The environment adjusting equipment 12 includes a temperature controlling equipment (like air condition), an air purification equipment and a humidity controlling equipment (such as humidifier), etc., The environment parameter collecting equipment 14 includes temperature sensors, humidity sensors, particle concentration (such as PM2.5) sensors etc. The environment parameter collecting equipment 14 sends the collected environment parameters to the intelligent equipment 11 or environment adjusting equipment 12.

The fitness equipment 13 can be one of a treadmill, an exercise cycle, a racing car, an elliptical car, a stationary bike, a row machine and strength a training machine etc. In the invention, the intelligent equipment 11 is wearable intelligent equipment, such as a smart watch, a smart bracelet, a smart chest belt, and a smart phones etc. The wearable intelligent equipment is easy to wear. During training the user usually wears intelligent equipment 11 (such as smart bracelets) which can monitor the training time, the calories and so on. In the invention, the intelligent equipment 11 obtains the environment and fitness equipment parameters collected by the environment parameter collecting equipment 14, and then adjusts the parameters of the environment adjusting equipment 12 and/or the fitness equipment 13, so as to change the current motion environment and make the user exercise in the optimum motion environment. It is well known that the parameters of the fitness equipment 13 are important to the user and incorrect parameter setting often causes sport injury to the user. Thus, in this invention, it is not only adjusting the parameters of the environment adjusting equipment 12 but also adjusting the parameters of the fitness equipment 13. Accordingly, the parameters of the optimum motion environment include parameters of the environment adjusting equipment 12 and parameters of the fitness equipment 13.

Figure 2:
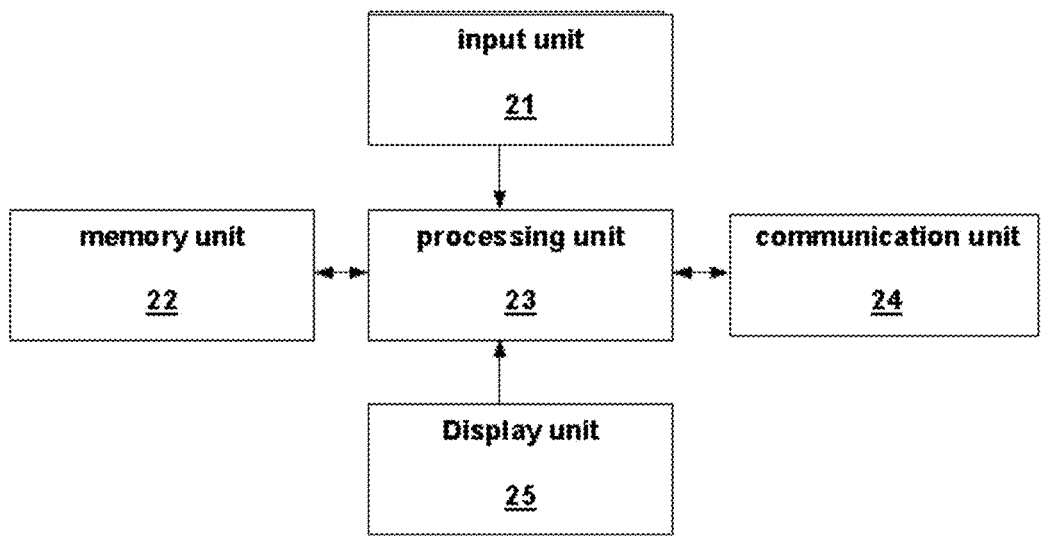
FIG. 2 is a schematic diagram representing an intelligent equipment according to an embodiment of the invention.

With reference to FIG. 2, the wearable intelligent equipment of the invention includes an input unit 21, a memory unit 22, a processing unit 23, a communication unit 24 and a display unit 25. A healthy motion environment managing software (APP) can be installed in the intelligent equipment, and realize the unified environment management by using the App.

Specifically speaking, the communication unit 24 communicates with the environment adjusting equipment, the fitness equipment and the environment parameter collecting equipment via WIFI. Bluetooth or other wireless manner. There is not physical visible line connection with the intelligent equipment, so the intelligent equipment has little effect for wearing. The fitness equipment and environment parameter collecting equipment send parameters of the equipment and environment to the intelligent equipment. The input unit 21 inputs the user's personal information or the equipment's set parameters, the input unit 21 can be a button, touch screen or voice inputting device etc., such as the user can input their personal information when the APP pops up an input interface. The display unit 25 displays the current environment parameters and/or motion information, such as displaying the current temperature, the humidity and the motion time and so on. The display unit 25 can be a LCD. The memory unit 22 records corresponding relation of the user's personal information and the optimum motion environment. The memory unit 22 can be one of RAM and EEPROM etc. Generally speaking, different users are respectively suitable for different optimum motion environments. Take normal healthy user as example, the appropriate motion temperature is about 20° C. for person under age 45 years old, but the appropriate motion temperature is about 25° C. for person over age 45 years old. Lower temperature is not appropriate for elders' exercising. Another example, the requirement of environmental air cleanliness level (such as PM2.5) for people with respiratory diseases is higher than that for normal healthy user. Thus, the invention creates a corresponding relation of the user's personal information and the optimum motion environment, and records the corresponding relation in the memory unit 22. The processing unit 23 obtains the corresponding relation from the memory unit 22, and adjusts the parameters of the environment adjusting equipment based on the obtained parameters of the fitness equipment, the parameters of the environment and the corresponding relation. Thus, the user gets the optimum motion environment by changing current motion environment.

Specifically speaking, the memory unit 22 records the corresponding relation of the user's personal information and the parameters of the optimum motion environment in a table form. The processing unit 23 searches the parameters of the corresponding optimum motion environment based on the personal information input in the input unit 21. After the parameters of the optimum motion environment were found, the parameters are displayed to the user by the display unit 25 and wait for the user's confirmation to use or not. After the user confirmed, the processing unit 23 sends the cited parameters to the environment adjusting equipment through the communication unit 24. The environment adjusting equipment compares the received value of the environmental parameter with the current environmental parameter which is obtained from the environment parameter collecting equipment. The equipment begins to adjust the corresponding environment to make current motion environment to approach the optimum motion environment when the differences of value of the environment parameters and the current environment parameters are greater than the set threshold. Also the environment parameter collecting equipment can send the current value of the environment parameter to the intelligent equipment, and then the intelligent equipment compares received value of the current parameter with the value of searched optimum environment parameter. If the difference of above two parameters is greater than the set threshold, the intelligent equipment sends start instruction to correspond environment adjusting equipment by the communication unit 24. After receiving the start instruction, the environment adjusting equipment starts to adjust the corresponding environment. After the current environment achieved the optimum motion environment, the intelligent equipment sends stop instruction and the equipment stops running. Of course, the user can input the value of the parameter of the environment adjusting equipment by the input unit 21 directly. The processing unit 23 sends the received parameter to the environment adjusting equipment, the environment adjusting equipment adjusts current environment according to the value of parameter input by the user.

Following is a further description with a specific embodiment. In the embodiment, the wearable intelligent equipment is a smart watch. In the motion environment, the temperature adjust equipment is an air condition, the air particles are adjusted by air purifier, and the fitness equipment are treadmill. The treadmill, the air condition, the air purifier, the temperature sensor and the air particles concentration sensor all have Bluetooth communication interfaces, and the smart watch sets connection with the treadmill, the air condition, the air purifier, the temperature sensor and the air particles concentration sensor through Bluetooth. The memory unit 22 of the intelligent equipment stores corresponding relation of the user's personal information and the optimum motion environment, with reference to table 1.

TABLE 1

| | User's personal information | | | Optimum environment parameters | | |
|---|---|---|---|---|---|---|
| | age | Height | weight | temperature | humidity | PM2.5 |
| Healthy | 3-10 | 50-120 cm | 15-40 kg | 26 | 40%-60% | <75 µg |
| | 10-45 | 120-180 cm | 40-90 kg | 22 | 40%-60% | <75 µg |
| | >45 | >180 cm | >90 kg | 26 | 40%-60% | <75 µg |
| respi- | 3-10 | 50-120 cm | 15-40 kg | 26 | 40%-60% | <25 µg |
| ratory | 10-45 | 120-180 cm | 40-90 kg | 22 | 40%-60% | <25 µg |
| diseases | >45 | >180 cm | >90 kg | 26 | 40%-60% | <25 µg |
| Heart | 3-10 | 50-120 cm | 15-40 kg | 26 | 40%-60% | <75 µg |
| and | 10-45 | 120-180 cm | 40-90 kg | 26 | 40%-60% | <75 µg |
| brain | >45 | >180 cm | >90 kg | 26 | 40%-60% | <75 µg |
| diseases | | | | | | |

The user starts the smart watch before workout and opens the motion managing APP in the smart watch, and then user inputs user's personal information (such as age, height, weight or the type of disease etc.) through the LCD touch screen of the watch. If a healthy user inputs his age is 50 years old by the input unit 21, the processing unit 23 obtains the optimum environment temperature is 26° C. by searching the table 1. If the user inputs 30 years old, the found temperature of optimum environment is 20° C. If the user is unhealthy, such as the user suffering from cardiovascular and cerebrovascular diseases and the user is 30 years old, the obtained temperature of optimum environment is 20° C. For the healthy people, the value of PM2.5 is under 75 µg, but for the user who suffering from respiratory disease requires PM2.5 below 25 µg. Accordingly, based on the personal information input by the user, the optimum motion environment parameters can be obtained from corresponding relation through searching table 1. After searching the optimum motion environment parameters, the parameters are displayed to the user by the display unit 25 and wait for the users confirmation of using the environment parameters or not. After the user confirmed, the processing unit 23 sends the parameters to the corresponding environment adjusting equipment by the communication unit 24. Such like that when a 30 years old user confirmed that the temperature is 22° C. of the environment parameters, the smart watch send the parameter of 22° C. to the air condition as the value of the set temperature. When the user confirmed the value of PM2.5 is under 25 μg, the intelligent equipment will send it to the air purifier.

The environment adjusting equipment compares the values of the received environmental parameters and values of the current environment obtained from the environment parameter collecting equipment, if the differences of these values are greater than the set threshold, the equipment will start and adjust corresponding environment to make current motion environment to be the optimum motion environment. When the air condition received that the value of setting temperature is 22° C., the air condition obtains the current value of temperature by temperature sensor, such as the current temperature is 30° C., the set threshold is 3° C., the difference between the value of set temperature and current temperature is greater than the set threshold, which is |30−22|=8≥3, and the air condition starts the cooling mode to reach the optimum environment temperature of 22° C. When the air purifier received the value of setting particles concentration under 25 μg, the air purifier obtains the current particles concentration by the particles concentration sensor, such as 55 μg, and the set threshold is 10 μg, the difference between value of the setting and current PM2.5 is greater than the set threshold, the air purifier starts to make the particles concentration to be reduced under 25 μg. This adjustment can take full function of the existing air condition, purifier, without additional temperature sensor, particle concentration sensor.

The environment parameter collecting equipment also can send the value of current environment parameter to the smart watch, and the smart watch compares the received value of current environmental parameter with the found value of optimum environment parameter, if the difference is greater than the set threshold, the intelligent equipment send start instruction to the corresponding environment adjusting equipment by the communication unit 24 to adjust corresponding environment. For example, the processing unit 23 obtains the optimum environment temperature is 22° C., the current temperature is 30° C., set threshold is 3° C., the difference of set value and current temperature is greater than the set threshold, which is |3−22|=8≥3, and then the processing unit 23 sends start instruction to the air condition, after received the instruction the air condition start, when the temperature reaches 22° C., the processing unit 21 sends stop instruction, and the air condition stops running. The procedure of adjusting PM2.5 is similar with the temperature adjustment. Reference to temperature adjustment, the procedure of particles concentration adjustment can be understood by those skilled in this field, so it will not be repeated. In the invention, the adjustment realizes centralism control through that the intelligent equipment unified controls each environment controlling equipment to start/stop.

Of course, the above table does not cover all possible users. Users have very widely requirement for the environment. For instance, if the user heats more after period of training or professional athletes are not satisfied with the optimum environment which is obtained by searching the table, the user can modify the optimum environment parameters through the input unit 21. For example, the user can input the set temperature as 26° C. through the input unit 21, and then the processing unit 23 sends it to the air condition after received the parameter, the air condition will control the temperature of environment to maintain at 26° C. It can satisfy the requirements of different users through manual modifying.

Further, the intelligent equipment can obtain equipment parameters of the fitness equipment through the communication unit 24, the equipment parameters include that whether the equipment is being used or not now and current set value of the parameter etc. The memory unit 22 prestores the corresponding relation of the user's personal information and the optimum equipment parameters. The processing unit 23 searches corresponding optimum equipment parameters based on the personal information that input through the input unit 21. When the optimum equipment parameters are found, the parameters are displayed to the user who need to confirm that the parameters can be used or not through the display unit 25. After the user's confirmation, the processing unit 23 will send the parameters to the corresponding fitness equipment through the communication unit 24. The fitness equipment compares the value of received parameter with the value of current equipment parameter, if the value of current equipment parameter is out of the value of the optimum equipment parameter, it will do corresponding adjustment to make the current equipment parameter be the optimum parameter.

Following is a further description with a specific embodiment. In the below embodiment, the wearable intelligent equipment is a smart watch. In the motion environment, the environment parameters are equipment parameters of the fitness equipment. The fitness equipment is a treadmill, and rotating and slope of the treadmill will be adjusted according to the requirement. The smart watch sets up the connection with the treadmill through the communication unit via Bluetooth. The memory unit 22 of the intelligent equipment records the table form of corresponding relation between the user's personal information and the optimum equipment parameters, such as table 2.

TABLE 2

| User's information | | | | Treadmill parameters | |
| --- | --- | --- | --- | --- | --- |
| | age | height | weight | Rotating speed | Slope |
| healthy | 3-10 | 50-120 cm | 15-40 kg | 0-2 KM/H | 0-5 degree |
| | 10-45 | 120-180 cm | 40-90 kg | 2-10 KM/H | 5-10 degree |
| | >45 | >180 cm | 90 kg | 0-2 KM/H | 0-5 degree |
| Knee | 3-10 | 50-120 cm | 15-40 kg | 0-1 KM/H | 0 degree |
| joint | 10-45 | 120-180 cm | 40-90 kg | 0-1 KM/H | 0 degree |
| disease | >45 | >180 cm | >90 kg | 0-1 KM/H | 0 degree |
| Lumbar | 3-10 | 50-120 cm | 15-40 kg | 0-1 KM/H | 0 degree |
| disease | 10-45 | 120-180 cm | 40-90 kg | 0-1.5 KM/H | 0 degree |
| | >45 | >180 cm | >90 kg | 0-1.5 KM/H | 0 degree |

Before starting workout, the user opens the smart watch, starts the motion managing APP in the smart watch and inputs the personal information such as age, height, weight, disease and so on through the LCD touch screen of the smart watch. When a healthy user inputs his/her age as 50 years old through the input unit 21, the processing unit 23 will obtain the optimum parameters of the treadmill which is rotating speed 0-2 KM/H and slope 0-5. If the user is 30 years old, the found optimum parameters are rotating speed 2-10 KM/H and slope 5-10. If the 30-year-old user is suffering from a knee joint disease, the found optimum parameters are rotating speed 0-1 KM/H and slope 0. Based on the personal information inputting by the user, the optimum equipment parameters corresponding to the user can be obtained by searching table2. When the optimum equipment parameters are found, the parameters are displayed to the user who need to confirm that the parameters can be used or not through the display unit 25. After the user's confirmation, the processing unit 23 will send the parameters to the treadmill through the communication unit 24. The fitness equipment compares the value of received parameter with the value of current equipment parameter, if the value of current equipment parameter is out of the value of the optimum equipment parameter, it will do corresponding adjustment to make the current equipment parameter be the optimum parameter. For instance, when the treadmill received that parameters are rotating speed 2-10 KM/H and slope 5-10, and the set parameters of the treadmill are rotating speed 1 KM/H and slope 6, since the current set rotating speed is out of the range of the optimum parameter, the treadmill will change the set rotating speed to 2 KM which is in the range of the optimum parameter. It is similar with the temperature adjustment, and it is also can adjust the equipment parameter by inputting user's set value directly through the input unit 21. The fitness equipment will adjust the current parameters based on the obtained equipment parameters which are input by the user from the intelligent equipment, and make them equal with the value which is set by the user. The procedure can be understood as well as the manual setting temperature, so it will not repeat here.

The above is a detailed description of environmental managing system of the present invention. From the above description it can be found that the wearable intelligent equipment is a core in the environmental managing system of the present invention. The user wears the corresponding intelligent equipment when he/she workouts, and parameters of environment controlling equipment (environment parameters) and fitness equipment are adjusted through the intelligent equipment to make the motion environment to reach the optimum one. This adjustment can be done according to the user's personal information, make each user to obtain the appropriate motion environment corresponding to himself/herself and avoid the blindness of the adjustment. The user can complete environmental adjustment through inputting environment parameters into the intelligent during their training, such as through voice inputting and touch screen inputting. Thus, the users do not need to interrupt their training and be away the fitness equipments to adjust the environment equipments one by one. The procedure of adjustment is simple, fast and improves the user's experience greatly.

Embodiment 2

Figure 3:
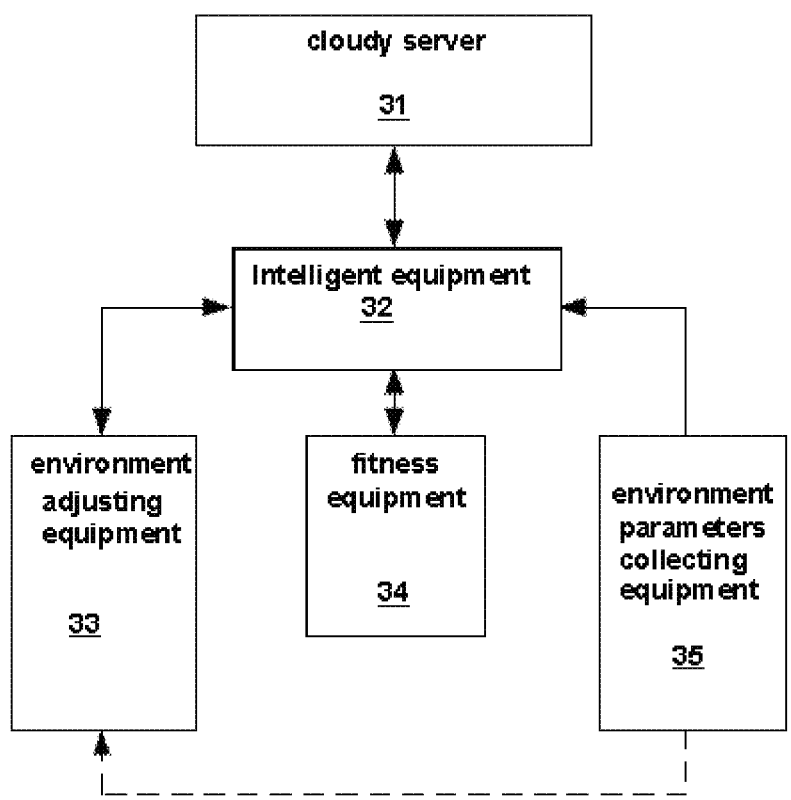
FIG. 3 is a schematic diagram representing an environment managing system according to an embodiment of the invention.

This embodiment focuses on the differences with the embodiment 1 and the similarities are not described in details. With reference to FIG. 3 the environment managing system of the present invention may include cloudy server 31, and the cloudy server communicates with the wearable intelligent equipment 31 via a wireless manner. The intelligent equipment 31 can send the obtained user's personal information, environment parameters collected by the environment parameter collecting equipment 35 and equipment parameters of the fitness equipment 34 to the cloudy server 31. The difference with the embodiment 1 is that the table 1 and table 2 are record in the cloudy server 31 which saves the corresponding relation of the user's personal information and the optimum motion environment parameters which includes the parameters of the environment adjusting equipment 33 and fitness equipment 34. The cloudy server 31 searches the optimum motion environment parameter based on the user's personal information and sends to the intelligent equipment 32. The intelligent equipment 32 receives the parameters and display to the user. After the confirmation of the said parameter from the user, it will be send to the corresponding environment adjusting equipment 33 or fitness equipment 34, and then the environment adjusting equipment 33 or fitness equipment 34 adjusts correspondingly according to the received parameters, in order to reach the optimum motion environment.

For the wearable intelligent equipment, miniaturization of equipment is more and more popular, but the disadvantage is that processing power and storage capacity of the intelligent equipment 32 is reducing. In this embodiment, the cloudy server 31 completes the storing and processing for main information, but it is good for miniaturization of equipment that the intelligent equipment 32 is only exist as a display and transmit equipment for the information.

Embodiment 3

Figure 4:
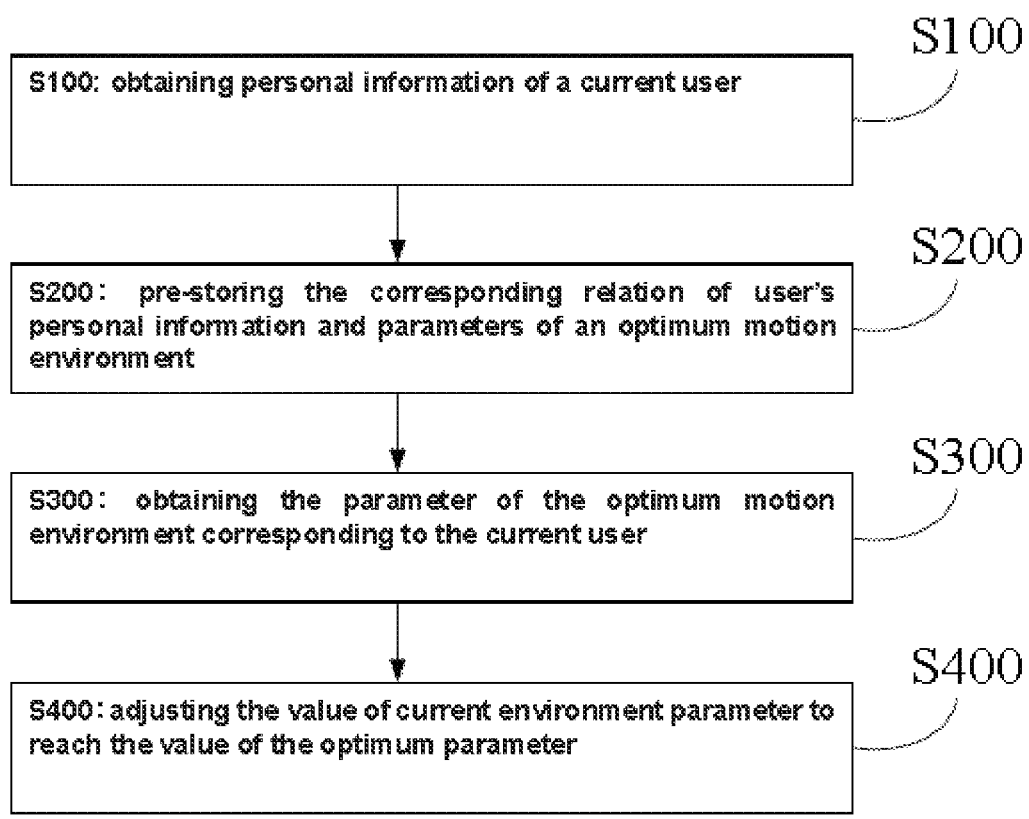
FIG. 4 is a flowchart representing an environment managing method according to an embodiment of the invention.

Correspondingly, with reference to FIG. 4, the present invention also states a method of motion environment managing, which includes the following steps: S100: obtain the personal information of a current user; S200: pre-store the corresponding relation of the user's personal information and the optimum motion environment parameter; S300: obtain the value of the optimum motion environment parameters corresponding to current user based on the obtained current user's personal information and the corresponding relation of the user's personal information and the optimum motion environment parameters; S400: adjust the values of current environment parameters to reach the value of optimum motion environment parameters.

Further, the optimum motion environment parameters include parameters of the environment controlling equipment and the fitness equipment. The step S100 also includes the step of obtaining the value of motion environment parameters set by current user; the step S400 includes sending the value of motion environment parameters set by the user to the environment controlling equipment and/or fitness equipment. The corresponding relation of the user's personal information and the optimum motion environment parameters includes corresponding relation form of user's personal information and parameters of optimum environment controlling equipment and corresponding relation form of user's personal information and parameters of optimum fitness equipment.

The step S400 specifically includes: compare the difference of the received values of optimum motion environment parameters and the values of current environment parameters, if the differences are over the set threshold, the environment controlling equipment starts to make the value of current environment parameter reach the value of optimum motion environment parameter. Or alternatively, compare the differences of the received values of optimum motion environment parameters and the values of current equipment parameters, if the values of current equipment parameters are out of the set values of the optimum environment parameters, the values of current equipment parameters is adjusted to make the values of current equipment parameters equal the values of optimum environment parameters.

Each embodiment in the present specification is described progressively, each embodiment focuses on differences from other embodiments, and the similar parts between the various embodiments are referred to each other. For the embodiment of the method in the present application, since it is substantially similar to the apparatus embodiment, the description is relatively simple, and the relevant parts are described in the description of the embodiments of the apparatus.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A healthy motion environment managing apparatus, including a wearable intelligent equipment, an environment adjusting equipment and a fitness equipment, wherein the wearable intelligent equipment comprising:
    an input unit configured for obtaining personal information of a current user;
    a memory unit configured for pre-storing a corresponding relation of optimum motion environment parameters and the obtained personal information of the current user;
    a processing unit configured for obtaining the optimum motion environment parameters corresponding to the current user and based on the obtained personal information of the current user and the corresponding relation of the obtained personal information of the current user and the optimum motion environment parameters; and
    a communication unit configured for sending the obtained optimum motion environment parameters to the environment adjusting equipment and/or the fitness equipment; and
    an environment parameter collecting equipment configured for sending a value of a collected current environment parameter to the environment adjusting equipment;
    wherein the environment adjusting equipment compares a difference of the value of the collected current environment parameter and a value of one of the obtained optimum motion environment parameters, if the difference is larger than a set threshold, the environment adjusting equipment is started, in order to make the value of the collected current environment parameter reach the value of the one of the optimum motion environment parameters.

2. The healthy motion environment managing apparatus of claim 1, wherein the optimum motion environment parameters comprise parameters of the environment adjusting equipment and the fitness equipment.

3. The healthy motion environment managing apparatus of claim 1, wherein the input unit further obtains the value of the one of the optimum motion environment parameters set by the current user; and the communication unit sends the value of the one of the optimum motion environment parameters set by the current user to the environment adjusting equipment and/or the fitness equipment.

4. The healthy motion environment managing apparatus of claim 1, wherein the corresponding relation of the obtained personal information of the current user and the optimum motion environment parameters includes a first correspondence table of the obtained personal information of the current user and the optimum motion environment parameters sent to the environment adjusting equipment, and a second correspondence table of the obtained personal information of the current user and the obtained optimum motion environment parameters sent to the fitness equipment.

5. A healthy motion environment managing apparatus, including a wearable intelligent equipment, an environment adjusting equipment and a fitness equipment, wherein the wearable intelligent equipment comprising:
    an input unit configured for obtaining personal information of a current user; a memory unit configured for pre-storing a corresponding relation of optimum motion environment parameters and the obtained personal information of the current user; a processing unit configured for obtaining the optimum motion environment parameters corresponding to the current user and based on the obtained personal information of the current user and the corresponding relation of the obtained personal information of the current user and the optimum motion environment parameters; and
    a communication unit configured for sending the obtained optimum motion environment parameters to the environment adjusting equipment and/or the fitness equipment; and
    an environment parameter collecting equipment configured for sending a value of a collected current environment parameter to the wearable intelligent equipment;
    wherein the processing unit compares a difference of the value of the collected current environment parameter and a value of one of the optimum motion environment parameters, if the difference is larger than a set threshold, a start instruction is sent to the environment adjusting equipment via the communication unit.

6. A healthy motion environment managing apparatus, including a wearable intelligent equipment, an environment adjusting equipment and a fitness equipment, wherein the wearable intelligent equipment comprising:
    an input unit configured for obtaining personal information of a current user; a memory unit configured for pre-storing a corresponding relation of optimum motion environment parameters and the obtained personal information of the current user; a processing unit configured for obtaining the optimum motion environment parameters corresponding to the current user and based on the obtained personal information of the current user and the corresponding relation of the obtained personal information of the current user and the optimum motion environment parameters; and
    a communication unit configured for sending the obtained optimum motion environment parameters to the environment adjusting equipment and/or the fitness equipment;
    wherein the fitness equipment compares a value of a current equipment parameter and a value of one of the optimum motion environment parameters, adjusts the value of the current equipment parameter when the value of the current equipment parameter is not equal to the value of the one of the optimum motion environment parameters, in order to make the value of the current equipment parameter equal to the value of the one of the optimum motion environment parameters.

* * * * *